US009939538B2

(12) United States Patent
Ing et al.

(10) Patent No.: US 9,939,538 B2
(45) Date of Patent: Apr. 10, 2018

(54) ACCURATE LIGHT-WEIGHT BROAD-ENERGY NEUTRON REMMETER AND USE THEREOF

(71) Applicant: Bubble Technology Industries Inc., Chalk River, Ontario (CA)

(72) Inventors: Harry Ing, Deep River (CA); Hugh Robert Andrews, Pembroke (CA); Martin R. Koslowsky, Deep River (CA); Martin Bernard Smith, Deep River (CA); Tobias Achtzehn, Deep River (CA)

(73) Assignee: Bubble Technology Industries Inc., Chalk, River, Ontario (CA)

( * ) Notice: Subject to any disclaimer, the term of this patent is extended or adjusted under 35 U.S.C. 154(b) by 0 days.

(21) Appl. No.: 15/247,977

(22) Filed: Aug. 26, 2016

(65) Prior Publication Data
US 2017/0059723 A1 Mar. 2, 2017

(30) Foreign Application Priority Data
Aug. 27, 2015 (CA) ...................................... 2901709

(51) Int. Cl.
*G01T 3/06* (2006.01)
*G01T 1/02* (2006.01)

(52) U.S. Cl.
CPC ................ *G01T 3/065* (2013.01); *G01T 1/02* (2013.01); *G01T 3/06* (2013.01)

(58) Field of Classification Search
CPC .............. G01T 1/02; G01T 3/06; G01T 3/065
See application file for complete search history.

(56) References Cited

U.S. PATENT DOCUMENTS

| 7,919,758 B2 * | 4/2011 | Stephan | G01T 3/00 250/390.04 |
| 2009/0045348 A1 * | 2/2009 | Stuenkel | G01T 3/06 250/390.11 |

(Continued)

OTHER PUBLICATIONS

Agostinelli, S. et al, "GEANT4 Collection", Nucl. Instrum. Meth. A 506 250-303 (2003).

(Continued)

*Primary Examiner* — Mark R Gaworecki
(74) *Attorney, Agent, or Firm* — James Creighton Wray; Meera P. Narasimhan

(57) ABSTRACT

A remmeter includes two or more different-sized hydrogenous moderators, each incorporating a hydrogenous spectroscopic fast neutron detector and a thermal neutron detector to provide more accurate neutron dosimetry across a wide range of neutron energies (thermal neutrons to >15 MeV) in a form factor that is lighter than conventional remmeters. The remmeter utilizes the principle of spectral dosimetry, where the energy or energy distribution of the incident neutrons is first measured and then this energy information (along with the measured fluence) is used to establish the dosimetric quantity using the various fluence-to-dose conversion curves (e.g. H*(10) (ICRP(1997)), NCRP-38(1971)). Using the method of spectral dosimetry, the large variation in response in these curves as a function of neutron energy (especially over the region 1 keV to 1 MeV) is largely mitigated through the use of the energy and fluence information, and the appropriate fluence-to-dose conversion curve to calculate the dose.

23 Claims, 9 Drawing Sheets

Concept of neutron remmeter, using two moderator assemblies.

(56) References Cited

U.S. PATENT DOCUMENTS

| | | | | |
|---|---|---|---|---|
| 2011/0266451 A1* | 11/2011 | Achtzehn | ............... | G01T 3/06 250/362 |
| 2013/0099125 A1* | 4/2013 | Grodzins | ............. | G01T 1/2008 250/362 |
| 2013/0228696 A1* | 9/2013 | McGregor | ............... | G01T 3/00 250/382 |

OTHER PUBLICATIONS

Andersson, I.O. and Braun, J.A., "A Neutron Rem Counter", Nukleonik 6, 237-241 (1964).

Awschalom, M. and Sanna, R.S., Radial. Prot. Dosim. 10 89-101 (1985).

Bramblett, R.L., Ewing, R.J. and Bonner, T.W., "A new type of neutron spectrometer", Nucl. Instrum. Meth. 9, 1-12 (1960).

Devine, R.T., Romero, L.L., Gray, D.W., Seagraves, D.T., Olsher, R.H., Johnson, J.P., "Evaluation of spectrum measurement devices for operational use", Nucl. Instrum Meth. A 476, 416-422 (2002).

Hankins, D.E., "Modified A-B Remmeter with Improved Directional Dependence and Thermal Neutron Sensitivity", Health Phys. 34, 249-254 (1978).

Hankins, D.E., "A Modified Sphere Neutron Detector", Report LA-3595, Los Alamos National Laboratory, (1967).

ICRP (International Council on Radiation Protection and Measurements), "Protection Against Ionizing Radiation from External Sources", Publication 15, Pergamon Press, Oxford, England (1969).

ICRP (International Council on Radiation Protection and Measurements), "Conversion Coefficient for use in Radiological Protection against External Radiation", Report 74, Annals of the ICRP, vol. 26, No. 3, Pergamon Press, Oxford, England (1997).

ICRP (International Council on Radiation Protection and Measurements), "Protection Against Neutron Radiation", Report 38, NCRP Publications, Washington DC, (1973).

Ing, H., Cross, W.G., and Bunge, P.J., "Spectrometers for Radiation Protection at Chalk River Nuclear Laboratories", Radiat. Prot. Dosim. 10, 137-145 (1985).

Ing, H., Djeffal, S., Clifford, E.T.H., Machrafi, R. and Noulty, R., "Portable Spectroscopic Neutron Probe", Radiat. Prot. Dosim. (2007) pp. 1-6, doi: 10.1093/rpd/ncm 049.

Leake, J.W., "A Spherical Dose Equivalent Neutron Detector" Nucl. Instrum. Meth 45, 151-156 (1966).

Mourges, M., Carossi, J.C., and Portal, G., "A Light Rem-Counter of Advance Technology", In Proc. Fifth Sym. Neutron Dosimetry, Munich, Sep. 17-21, 1984, EVR 9762 vol. 1. p. 387-401.

Nachtigall, D. "Der gegenwatige Stand der praktischen Neutronendosimetrie", Jul-69-st KFA. Jul. 1962.

Olsher, R.H., Seagraves D.T., Eisle S.L., Bjork C.W., Martinez W.A., Romero L.L., Mallett M.W., Duran M.A., Hurlburt C.R., "PRESCILA: a new, lightweight neutron rem meter", Health Phys. 86 (2004) 603-612.

Widell, C.O. and Svansson, L., "Neutron Monitor for Radiation Protection Purposes", In Neutron Monitoring for Radiation Protection Purposes, STU/PUB/318, pp. 225-230, IAEA Vienna (1973).

Zaitseva N., Rupert B.L., Pawetczak, I., Glenn, A., Martinez, H.P., Carman, L., Faust, M., Cherepy, N., Payne, S., "Plastic scintillators with efficient neutron/gamma pulse shape discrimination", Nucl. Instrum. Meth. A 668 (2012) pp. 88-93; doi: 10.1016/j.nima.2011. 11.071.

\* cited by examiner

Fig. 1 Response per unit dose-equivalent versus neutron energy for conventional remmeters using spherical moderators of various sizes (data taken from Awschalom and Sanna (1985)).

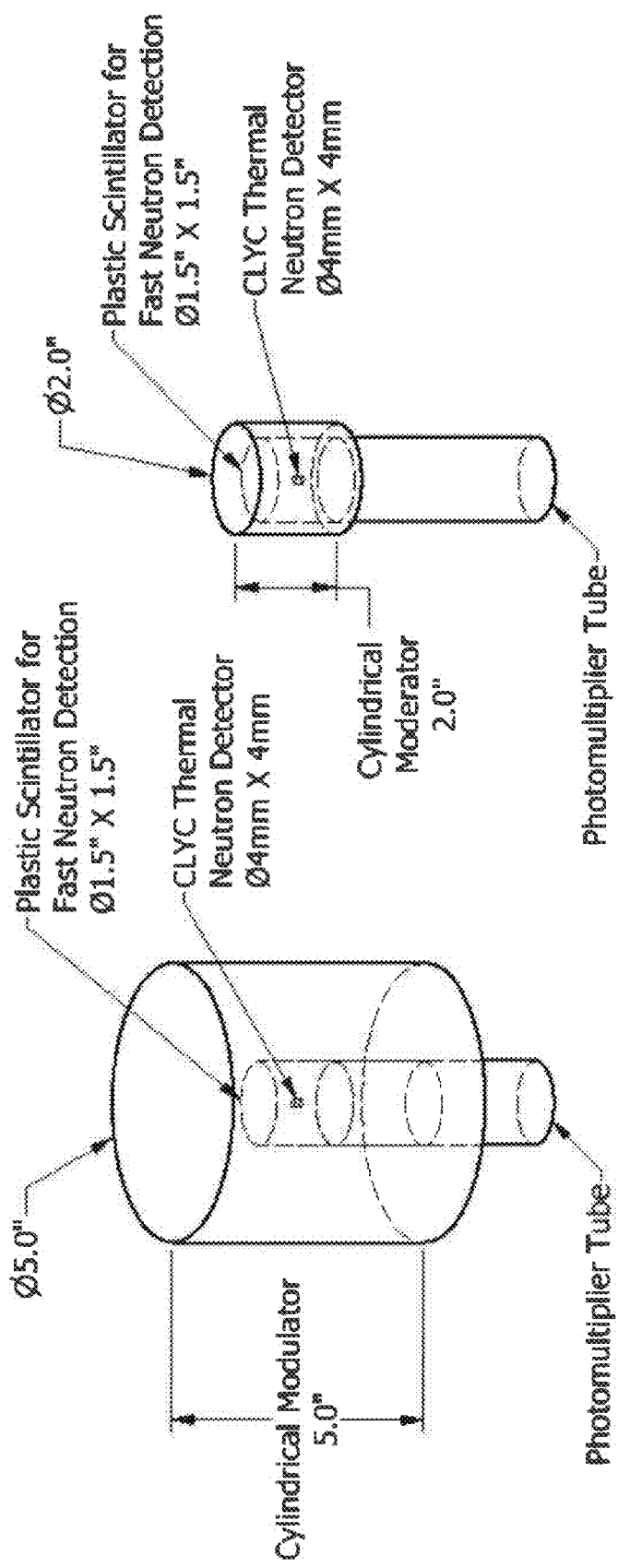
Fig. 5 Concept of neutron remmeter, using two moderator assemblies.

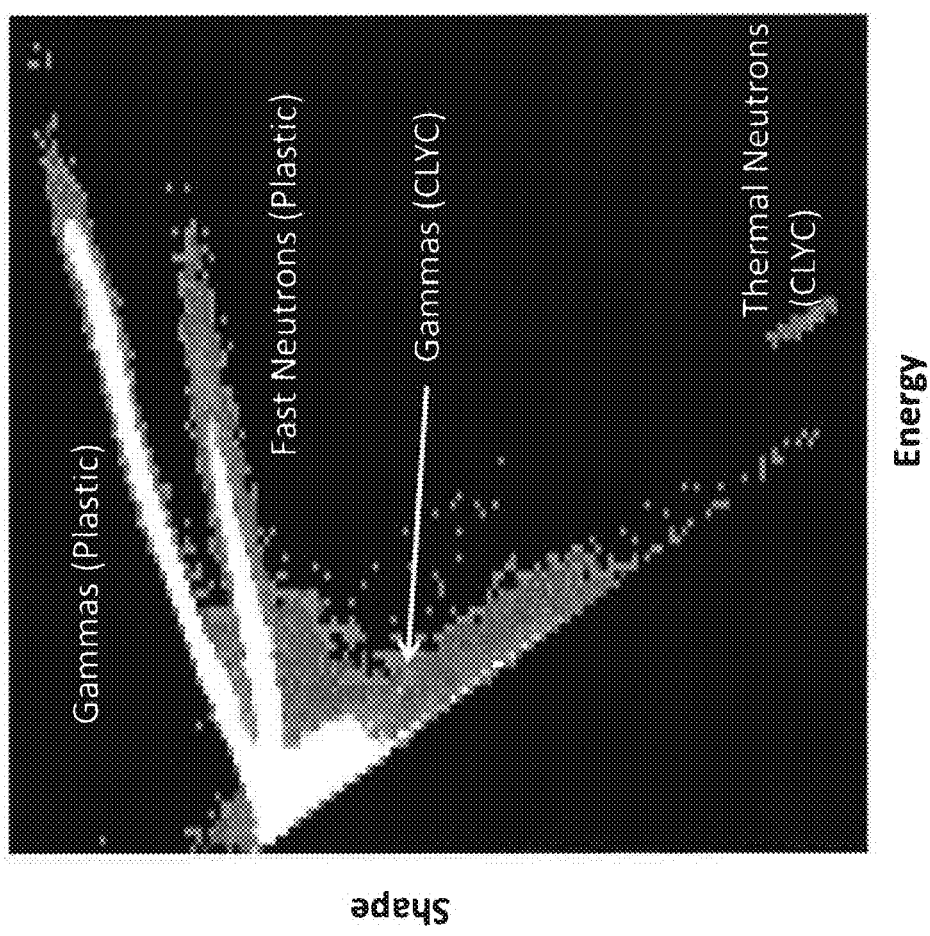
Fig. 6 Signals from the plastic scintillators and from the CLYC detector viewed by a single photomultiplier

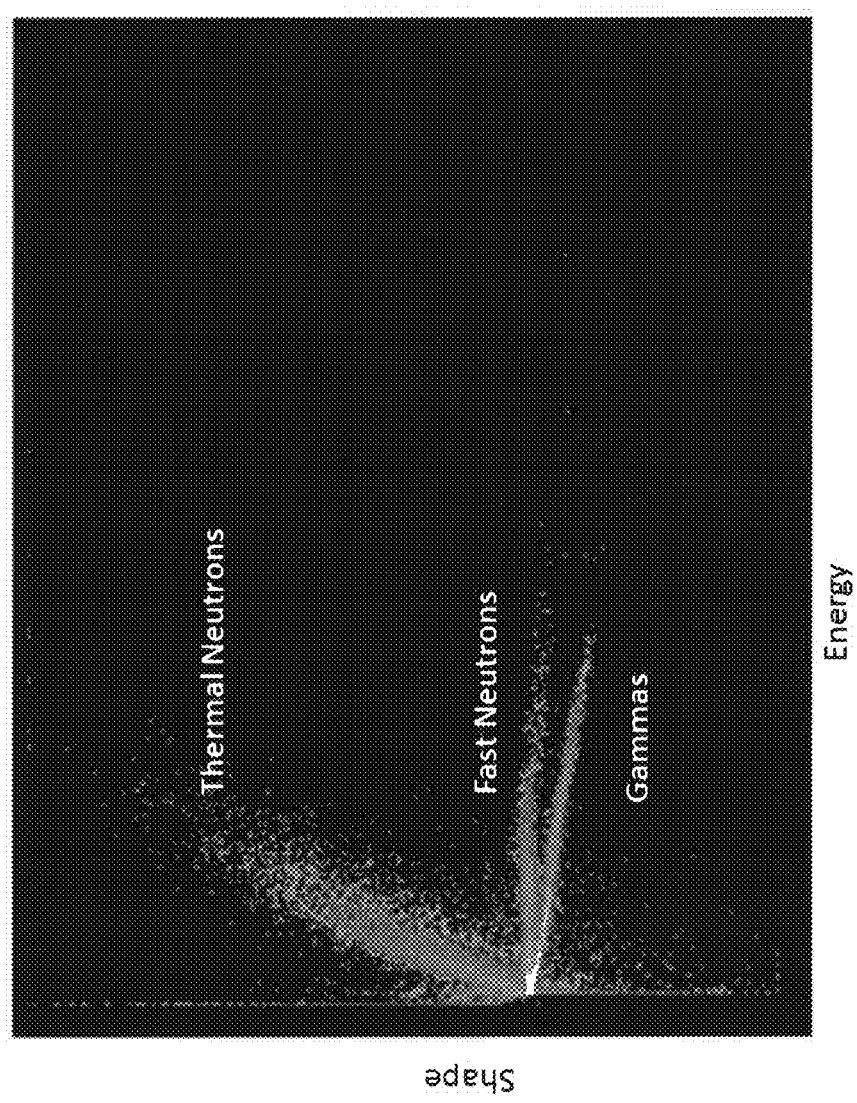
Fig. 7 Signals from a plastic scintillator and from a thin layer of ZnS($^6$Li) painted on its outer surface (excluding surface for photomultiplier attachment)

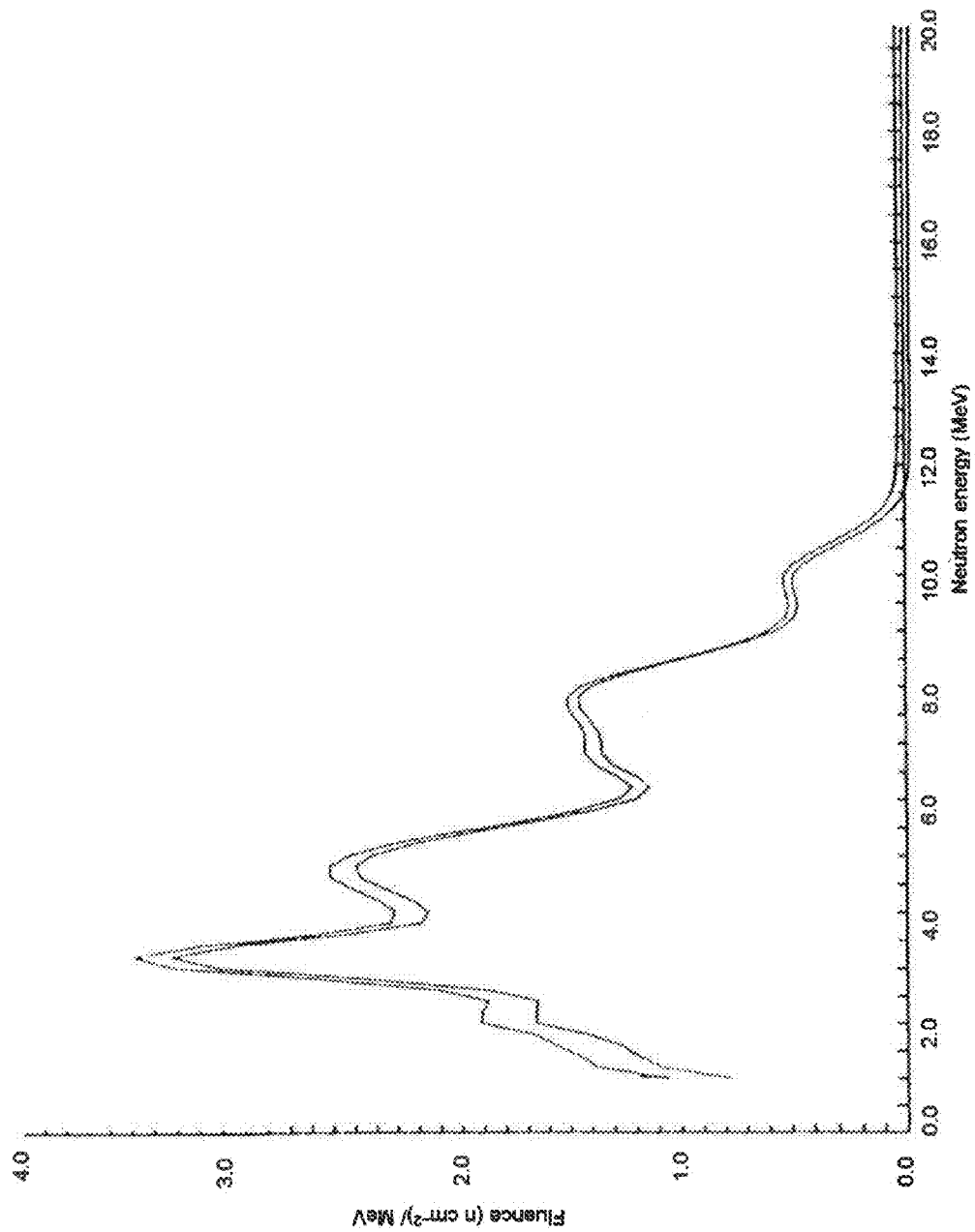
Fig. 8 Neutron spectrum from a $^{239}$PuBe neutron source, measured using a liquid scintillator with pulse-shape discrimination (data taken from Ing et al (1985))

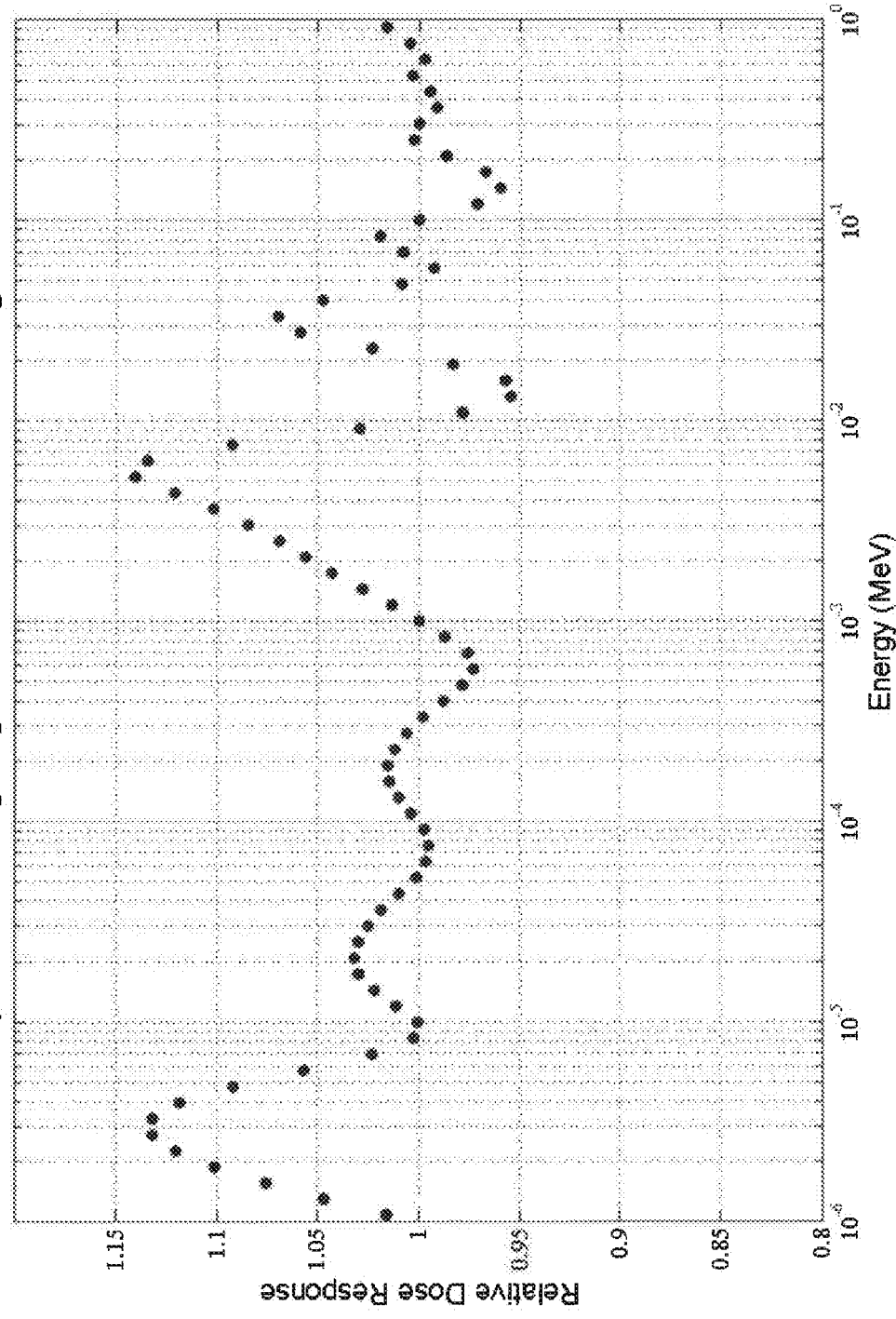
Fig. 9 Accuracy of dose-equivalent using the 2-moderator approach over the neutron energy range thermal to 1 MeV

ACCURATE LIGHT-WEIGHT BROAD-ENERGY NEUTRON REMMETER AND USE THEREOF

This application claims the benefit of Canadian Application No. 2,901,709 filed Aug. 27, 2015, which is hereby incorporated by reference in its entirety as if fully set forth herein.

FIELD OF THE INVENTION

The present invention relates to a neutron remmeter for measuring the intensity of a neutron field produced by radioactive materials or machines that produce neutron radiation.

BACKGROUND OF THE INVENTION

The most common meters for measurement of neutron dose (remmeters) are based on neutron moderators, with a thermal neutron detector in the center. Bramblett et al (1960) initiated this design when they proposed that a 12-inch diameter polyethylene sphere having a $^6$LiI(Eu) thermal neutron detector at its center provides a reasonable approximation to the dose-equivalent curve for neutrons (ICRP (1969)) from thermal to approximately 20 MeV. The dose-equivalent response of such a detector, calculated using GEANT4, a modern Monte Carlo simulation code (Agostinelli et al (2003)), shows that such a remmeter still over-responds by over a factor of 3 at around $10^{-3}$ MeV and increasingly under-responds above 10 MeV.

Over the years, many variants of this moderator design were produced by other groups (Nachtigall (1962), Leake (1966); Hankins (1967)). Such remmeters are currently commercially available from several vendors (Canberra, Ludlum, Berthold, Tech-Associates, Owen Scientific), with the $^6$LiI(Eu) detectors often replaced by small $^3$He gas counters to improve gamma discrimination. Other moderator designs have replaced the spherical moderator by a cylindrical moderator (Anderson and Braun (1964); Widell and Svansson (1973); Hankins (1978)), which sacrifices isotropic detection performance. The major problem with the use of a larger moderator is that the remmeter is too heavy (>15 kg) for ease of use in many operational scenarios.

There has always been a desire for a lighter remmeter. Manufacturers have produced remmeters using smaller moderators, but the physics of neutron moderation is such that dose-equivalent accuracy is sacrificed. For example, when one considers the dose-equivalent response of an 8"-diameter and a 5"-diameter polyethylene sphere, it can be seen that the over-response of the 8" sphere at 1 keV is about 15 and over 50 for the 5" sphere, with correspondingly poorer performances above 10 MeV. It is generally recognized that moderators smaller than about 8" would be too inaccurate for practical neutron dosimetry over a broad energy range. Unfortunately, a remmeter based on even an 8" moderator is still too heavy (>5 kg) for convenient operational use.

Our company produced a light (4.1 kg) neutron remmeter over 10 years ago (Ing et al (2007)), based on spectral dosimetry. Our Microspec Spectroscopic Neutron Probe (MSNP) was intended for extremely accurate neutron dosimetry for use by specialists, but not for direct competition with conventional remmeters, because it was not sufficiently robust for many field uses. This probe uses a hydrogenous liquid scintillator with neutron/gamma discrimination capability (commonly used for neutron spectroscopy in laboratories) as the detector for fast (>0.8 MeV) neutrons and a $^3$He gas counter, embedded in a thick $^{10}$B shell of special design, as the detector for thermal and intermediate energy (<0.8 MeV) neutrons. The $^{10}$B shell was designed so that the $^3$He counter would have a dose-equivalent response that closely mimics the dose-equivalent curve over this energy region. Tests done by ourselves and others (Devine et al (2002)) confirm the high dosimetric accuracy of this product.

There have been developments of light remmeters by other groups (Olsher et al, (2004), Mourges et al (1984)) and products by various manufacturers (Canberra, Ludlum, Health Physics Instruments). However, these are for more restricted or specialized radiation fields and do not perform well as general purpose remmeters for a variety of operational neutron fields.

The recent development of a plastic scintillator (Zaitseva et al (2012)) that has neutron/gamma discrimination properties comparable to that of the traditional hydrogenous liquid scintillator (BC 501A) to permit the electronic separation of neutron and gamma-ray signals, provides a basic technology for the development of a general purpose light remmeter along the lines of our MSNP. The new plastic scintillator overcomes the major operational weaknesses of the previous liquid scintillator by allowing its use below freezing temperatures and eliminating the issue of failure of the liquid seal. The use of the new scintillator enables the development of the long-sought light-weight remmeter.

However, the use of the new plastic scintillator only enables the measurement and dosimetry of fast neutrons of ~0.8 MeV and above. In the MSNP, the thick special $^{10}$B shell with the embedded $^3$He counter performs the dosimetry of thermal and intermediate energy neutrons (~0.025 eV to 0.8 MeV). While this same approach could be used with the new plastic scintillator, it is not ideal because of the high costs of both $^{10}$B and $^3$He and the limited global supply of the latter.

According to one embodiment of the invention, there is provided an alternative and technically-superior approach to the dosimetry of neutrons in the thermal to intermediate energy region. It uses the properties of two different size moderators (whose combined weight is much less than a single large moderator) to determine the energy (or distribution of energies) of the neutrons in this energy region.

SUMMARY OF THE INVENTION

This invention describes a remmeter that is based on the use of an assembly comprising two or more different-sized hydrogenous moderators, each hydrogenous moderator incorporating a hydrogenous spectroscopic fast neutron detector and a thermal neutron detector in order to provide more accurate neutron dosimetry across a wide range of neutron energies (thermal neutrons to >15 MeV) in a form factor that is lighter than conventional remmeters. The new remmeter utilizes the principle of spectral dosimetry, where the energy or energy distribution of the incident neutrons is first measured and then this energy information (along with the measured fluence) is used to establish the dosimetric quantity using the various fluence-to-dose conversion curves (e.g. H*(10) (ICRP (1997)), NCRP-38 (1971)). Using the method of spectral dosimetry, the large variation in response in these curves as a function of neutron energy (especially over the region 1 keV to 1 MeV) is largely mitigated through the use of the energy and fluence information, and the appropriate fluence-to-dose conversion curve to calculate the dose.

The desire for minimum weight for the remmeter also requires minimizing the signal-processing electronics in the system. This invention proposes a technique that enables readout of both fast and thermal neutron dose information using a common photodetector and electronics.

The thermal neutron detector could be a scintillator read by a first photodetector which is also used for reading the hydrogenous spectroscopic fast neutron detector or by a second photodetector. Alternatively, the thermal neutron detector could be a gas counter and further comprises pulse-counting electronics for reading the thermal neutron detector. In another alternative, the thermal neutron detector could be a solid-state detector and further comprises pulse-counting electronics for reading the thermal neutron detector.

The ratios of thermal responses from the hydrogenous moderators are used to provide accurate dosimetry for low-energy neutrons and intermediate-energy neutrons.

The sizes of the moderators and detectors are chosen to enable both low dose rate and high dose rate detection capabilities. The moderator sizes are optimized, such that the cumulative weight of the assembly is less than the weight of a conventional assembly having only a single large hydrogenous moderator, while being capable of providing comparable or better neutron dosimetry accuracy and sensitivity.

The thermal neutron detector is optimally positioned inside the hydrogenous spectroscopic fast neutron detector, which in turn is optimally positioned inside the hydrogenous moderator, to achieve optimum isotropic dose response.

The dosimetric accuracy of each assembly is improved through the addition of a layer of neutron-absorbing material within the hydrogenous moderator to reduce the number of excess thermal neutrons produced within the hydrogenous moderator that reach the thermal neutron detector relative to the number of intermediate-energy neutrons. In one embodiment the layer of neutron-absorbing material includes Cd foil.

The hydrogenous spectroscopic fast neutron detector and thermal neutron detector are scintillators having different pulse shapes to allow electronic separation of fast-neutron, thermal-neutron and gamma ray events.

The thermal neutron sensitivity is derived from a coating of thermal-neutron-sensitive material applied to the surface of the fast-neutron scintillator, including but not limited to Li-6 or B-10-loaded ZnS paint or other scintillating paint.

The thermal neutron sensitivity is provided by a thermal-neutron-sensitive scintillator, including but not limited to Li-6 iodide, Li-6 glass, Cesium Lithium Yttrium Chloride (CLYC), or other elpasolite compounds.

The hydrogenous spectroscopic fast neutron detector is doped with a thermal-neutron-sensitive material to provide both fast and thermal neutron signals separable by pulse-shape-discriminating techniques.

Signals from both the fast and thermal neutron scintillators are viewed by a single photodetector and neutron/gamma pulse-shape-discrimination techniques are used to distinguish the signals from the two scintillators embedded within a single hydrogenous moderator.

The photodetector could be a photomultiplier.

BRIEF DESCRIPTION OF THE DRAWINGS

Embodiments of the invention will now be described with reference to the accompanying drawings in which:

FIG. 5 is a diagram of the concept of neutron probe based on two moderators;

FIG. 6 shows the signals from the fast and thermal neutron detectors (in this case, plastic scintillator and a CLYC detector, respectively) viewed by a single photomultiplier;

FIG. 7 shows the signals from a detector arrangement wherein a plastic scintillator is used for fast neutron detection and the thermal neutron detection is provided by a thin layer of ZnS ($^6$LI) painted on the outer surface of the plastic scintillator (excluding the surface used for photomultiplier attachment);

FIG. 8 is a graph showing the neutron spectrum from a $^{239}$PuBe neutron source, measured using a hydrogenous fast neutron detector (in this case, a liquid scintillator) with pulse-shape discrimination;

FIG. 9 is a graph showing the accuracy of dose-equivalent over the neutron energy range thermal to 1 MeV using a two-moderator approach.

DETAILED DESCRIPTION

The recent development of a plastic scintillator (Zaitseva et al (2012)) that has neutron/gamma discrimination properties comparable to that of the traditional hydrogenous liquid scintillator (BC 501A) to permit the electronic separation of neutron and gamma-ray signals, provides a basic technology for the development of a general purpose light remmeter along the lines of our Microspec Spectroscopic Neutron Probe (MSNP). The new plastic scintillator overcomes the major operational weaknesses of the previous liquid scintillator by allowing its use below freezing temperatures and eliminating the issue of failure of the liquid seal. The use of the new plastic scintillator enables the development of the long-sought light-weight remmeter.

However, the use of the new plastic scintillator only enables the measurement and dosimetry of fast neutrons of ~0.8 MeV and above and, on its own, does not provide accurate dosimetry for thermal and intermediate energy neutrons. In the MSNP, the thick special $^{10}$B shell with the embedded $^3$He counter performs the dosimetry of thermal and intermediate energy neutrons (~0.025 eV to 0.8 MeV). While this same approach could be used with the new plastic scintillator, it is not ideal because of the high costs of both $^{10}$B and $^3$He and the limited global supply of the latter.

This invention employs an alternative and technically-superior approach to the dosimetry of neutrons in the thermal to intermediate energy region. It uses the properties of two different sized moderators (whose combined weight is much less than a single large moderator) to determine the energy (or distribution of energies) of the neutrons in this energy region.

Figure 1:
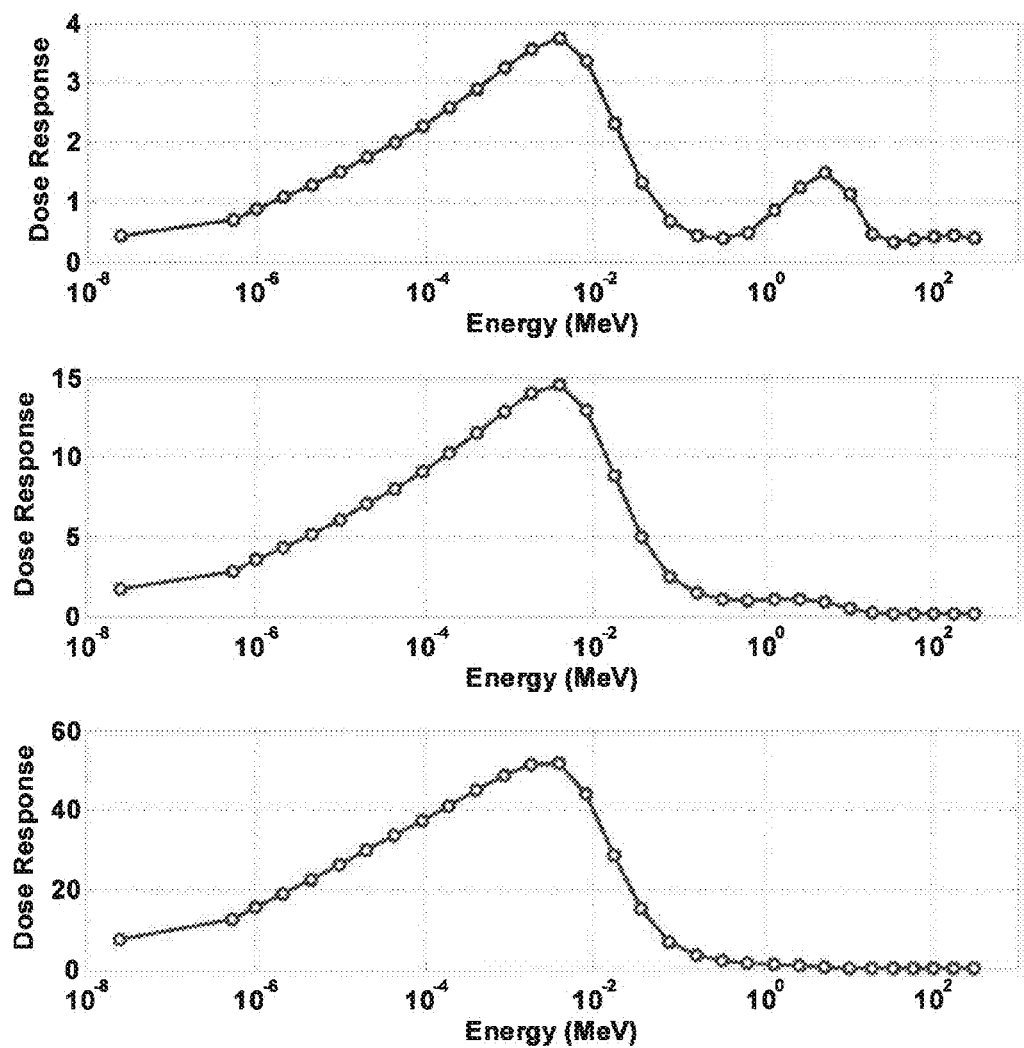
FIG. 1 is a graph showing the response per unit dose equivalent versus neutron energy for spherical moderators of various sizes.

FIG. 1 shows the response per unit dose-equivalent versus neutron energy for conventional remmeters using spherical moderators of various sizes (data taken from Awschalom and Sanna (1985)). The upper panel shows the response of a 12"

sphere; the middle panel presents the response for an 8" sphere; and the lower panel shows the response for a 5" sphere. An ideal dose response equals 1 across the energies shown. In a conventional neutron remmeter, as the size of the moderator decreases, the accuracy of the dose response becomes increasingly poor, with a 5" moderator system over-responding by approximately 50 times at around 0.001 MeV and under-responding above 10 MeV.

Figure 2:
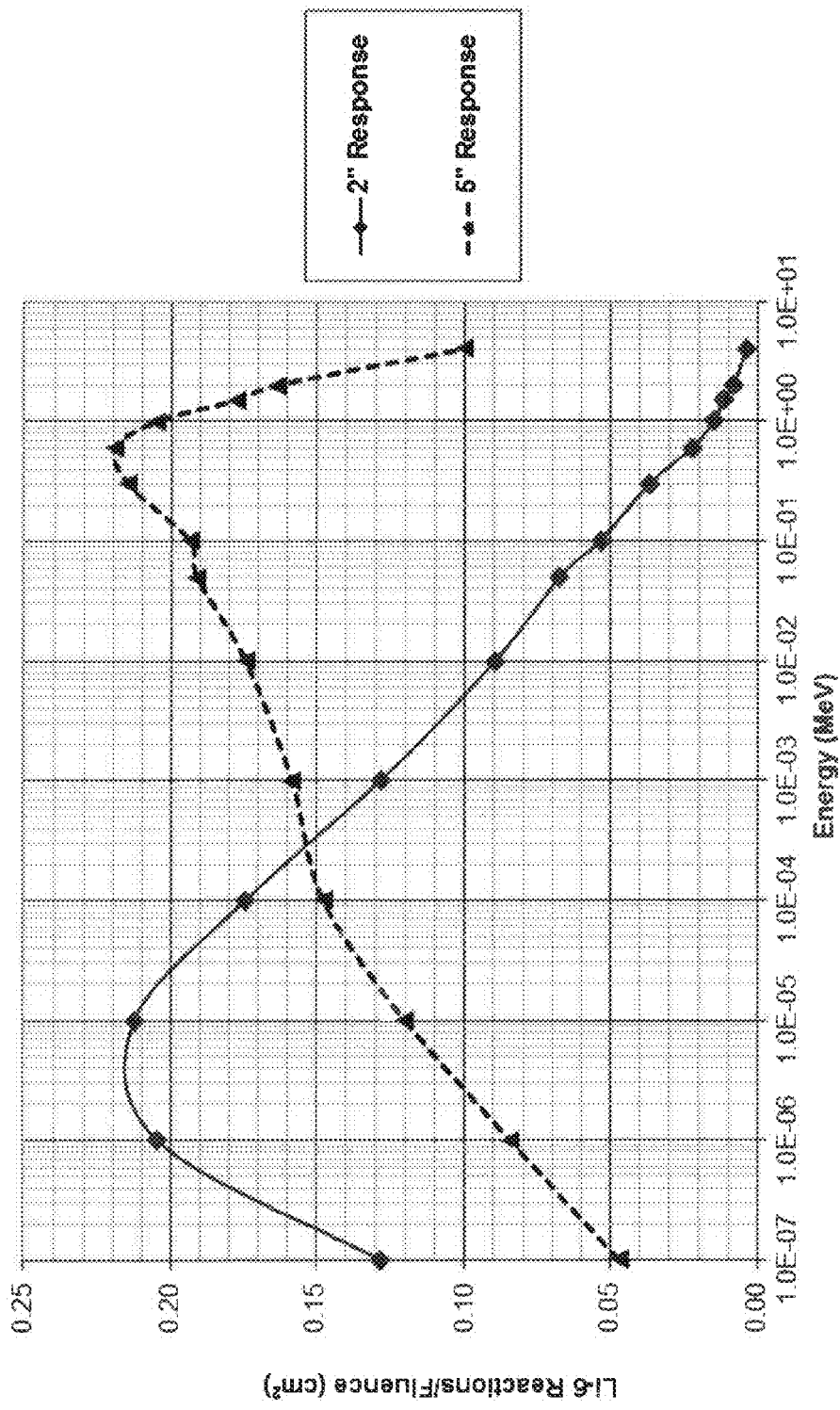
FIG. 2 is a graph showing the responses of 2" and 5" diameter spheres of polyethylene with thermal neutron detectors at their centers using the Monte Carlo simulation code GEANT4 with Thermal Scattering Model.

FIG. 2 shows the responses of 2" and 5" diameter polyethylene moderators with thermal neutron detectors in their centers. The two response functions with neutron energy are very different and this difference can be exploited to achieve accurate dosimetry.

Figure 3:
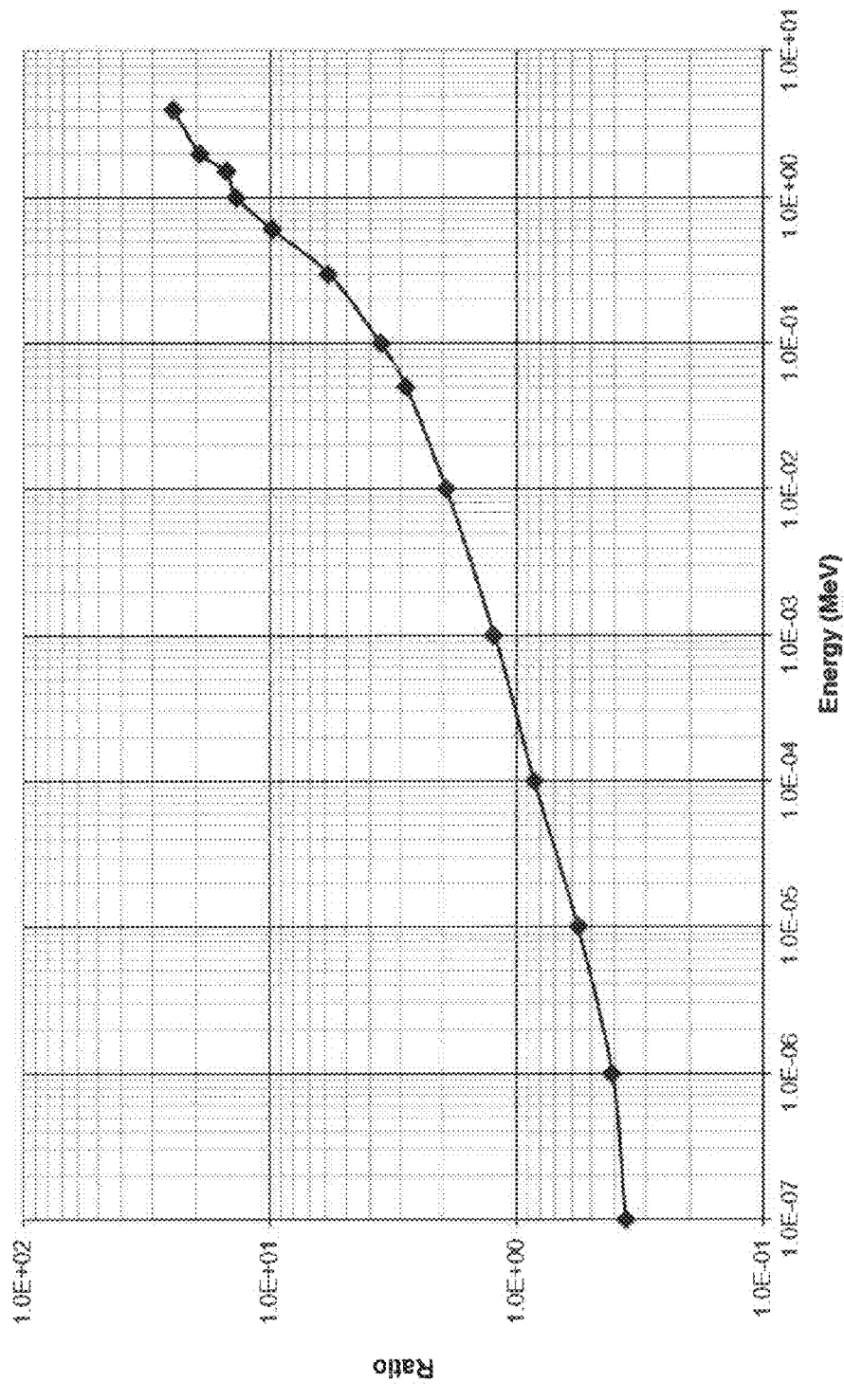
FIG. 3 is a graph showing the ratio of responses from 5" to 2" spherical moderators.

FIG. 3 shows the ratio of the response of the 5" moderator to that of the 2" moderator. This curve indicates that the ratio of responses can uniquely identify the energy of the neutrons over the thermal and intermediate energy region. For a distribution of neutrons, the ratio will provide an average energy of the distribution which is well suited for accurate dosimetry of practical radiation fields.

Figure 4:
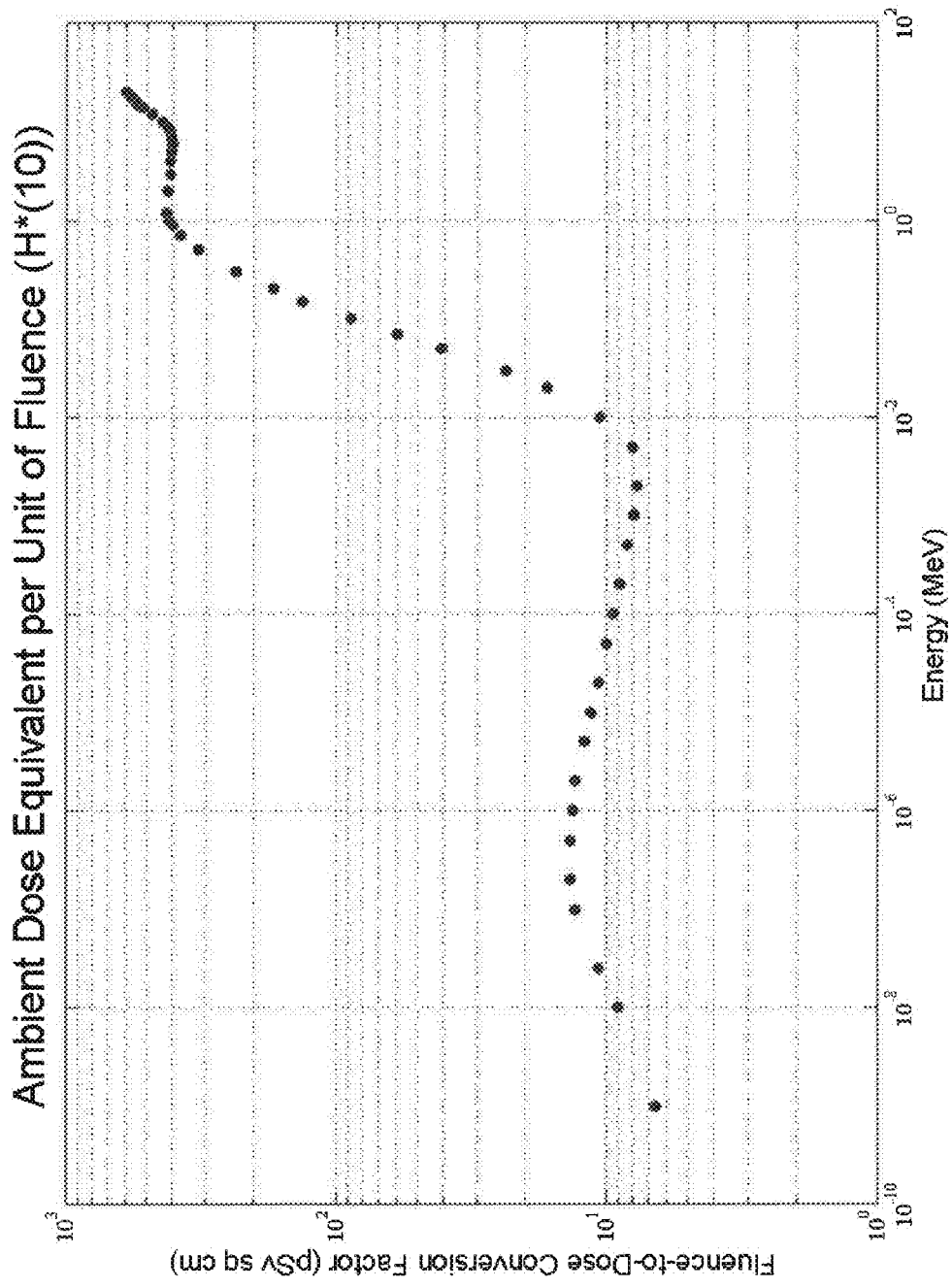
FIG. 4 is a graph showing the ambient dose equivalent per unit of fluence (H*(10))

This invention describes a remmeter that is based on the use of one or more hydrogenous moderators each incorporating a hydrogenous spectroscopic fast neutron detector and a thermal neutron detector. The remmeter utilizes the principle of spectral dosimetry, where the energy or energy distribution of the incident neutrons is first measured and then this energy information (along with the measured fluence) is used to establish the dosimetric quantity using the various fluence-to-dose conversion curves (e.g. H*(10), NCRP-38). This contrasts with trying to design a remmeter whose intrinsic response is similar to one of these curves. This has been proven to be very difficult to achieve because of the intrinsic properties of moderators; the main difficulty arises from the large variation in the fluence-to-dose conversion factors, especially over the range 1 keV to 1 MeV, where the variation exceeds a factor of 30 (FIG. 4). Using the method of spectral dosimetry, this large variation in response is largely mitigated through the use of the energy and fluence information, and the appropriate fluence-to-dose conversion curve to calculate the dose.

The desire for minimum weight for the remmeter also requires minimizing the signal-processing electronics in the system. This invention proposes a technique that enables readout of both fast and thermal neutron dose information using a common photodetector and electronics.

FIG. 5 illustrates the principle where the thermal neutron detector is located inside, or is a coating on the surface of, the new plastic scintillator; and the plastic scintillator is, in turn, embedded within the 2" or 5" diameter moderator. Each of the two sub-assemblies now produces two sets of spectral/dosimetric data: signals from the plastic scintillator from gamma rays and neutrons, and signals from the thermal neutron detector from gamma rays and neutrons.

FIG. 5 also illustrates the concept of neutron remmeter, using two moderator assemblies. CLYC is used as the thermal neutron detector at the center and is embedded within a hydrogenous fast neutron detector (i.e. plastic scintillator), which in turn is surrounded by a 5" diameter×5" high cylindrical moderator (left) and by a 2" diameter×2" high cylindrical moderator (right). A single photomultiplier (PMT) detects the signals from both the plastic scintillator and the CLYC scintillator for each detector/moderator assembly.

FIG. 6 shows these two pairs of signals when a thermal neutron detector called CLYC is used as the center detector. This figure is a conventional display for neutron/gamma discrimination of signals. The particular type of signal (gamma, fast neutron, thermal neutron) is selected using mathematical boundaries to circumscribe the signals of interest. In this case, the fast neutron signals (from hydrogen recoil) from the plastic and the thermal neutron signals (from thermal neutron capture in $^6$Li) are the signals of interest. Here, the fast neutron signals from the plastic provide the information for measuring the neutron spectrum for fast neutrons, while the signals from the thermal neutrons provide the response to thermal and intermediate energy neutrons. Both sets of information are provided by using a single photodetector (e.g. a photomultiplier). By using this photo-detection scheme, one gets the fast neutron responses and the thermal+intermediate energy responses for the two moderators assemblies by using only 2 electronic processing systems despite the fact that 4 types of signals are produced by the remmeter.

FIG. 7 shows the neutron/gamma discrimination display where the outer surface of the new plastic scintillator is coated with a thin layer of ZnS($^6$Li) paint for thermal neutron detection and both scintillators (plastic and ZnS paint) are viewed by a single photomultiplier tube. Since the ZnS paint is intrinsically not very transparent, the light from thermal neutron capture in $^6$Li is degraded and does not appear as a well-defined spot in this plot. On the other hand, because the paint layer is less than 1 mm thick, its gamma response in negligible. Here again, the hydrogen-recoil signals from the new plastic and the $^6$Li capture reaction signal from thermal neutrons are easily separable using electronics means. These detection assemblies can be embedded within the two moderators as a different embodiment of the proposed remmeter. In fact, any thermal neutron detector (including but not limited to $^6$Li-glass, $^6$LiI, $^{10}$B-glass) B glass) that has a different fluorescence decay time from the plastic scintillator and can be physically embedded in the plastic scintillator can be used in the envisaged remmeter.

The accuracy of spectral dosimetry is completely dependent on the accuracy of measuring the neutron spectrum, since the subsequent conversion to dose is governed by curves whose accuracy is assumed to have negligible error. For fast neutrons, where the spectrum is measured using hydrogen recoil, this approach provides the most accurate technique for spectral measurements of neutron fields. FIG. 8 shows a neutron spectrum using a liquid scintillator (preceding the advent of the plastic scintillator) for a $^{239}$PuBe neutron source. The double curve provides an estimate of the fluence accuracy for spectral dosimetry. Expert groups (Devine et al (2002)) have demonstrated that the fast neutron dosimetric response of the MSNP is accurate to within 5%.

To assess the dosimetric accuracy of using two different sized moderators, we have done Monte Carlo simulations of monoenergetic neutrons impinging the two moderators and used their relative count-rate to derive the neutron energies for computing the dose for such monoenergetic neutrons. FIG. 9 shows the accuracy of the dose-equivalent using such an approach. The maximum deviation of ±15% is a vast improvement over the accuracy of remmeters based on the use of large moderators.

The scope of the claims should not be limited by the preferred embodiments set forth in the examples, but should be given the broadest interpretation consistent with the description as a whole.

The embodiments of the invention in which an exclusive property or privilege is claimed are defined as follows:

1. A detection system providing neutron dosimetry across a wide range of neutron energies, from thermal neutron energies to neutron energies in excess of 15 MeV, comprising:
   an assembly comprising two or more different-sized hydrogenous moderators;
   each hydrogenous moderator comprising
   (i) hydrogenous spectroscopic fast neutron detector;
   (ii) a thermal neutron detector; and
   (ii) a first photodetector for reading the hydrogenous spectroscopic fast neutron detector.

2. The detection system according to claim 1 where the thermal neutron detector is a scintillator read by said first photodetector.

3. The detection system according to claim 1 where the thermal neutron detector is a scintillator, said detection system further comprising a second photodetector for reading said thermal neutron detector.

4. The detection system according to claim 1 where the thermal neutron detector is a gas counter, said detection system further comprising pulse-counting electronics for reading said thermal neutron detector.

5. The detection system according to claim 1 where the thermal neutron detector is a solid-state detector, said detection system further comprising pulse-counting electronics for reading said thermal neutron detector.

6. The detection system according to claim 1 wherein the ratios of thermal responses from said hydrogenous moderators are used to provide dosimetry for low-energy neutrons and intermediate-energy neutrons to within ±50%.

7. The detection system according to claim 1 wherein the sizes of the moderators and detectors are selected for detection of dose rates below 25 μSv/h or above 25 μSv/h, to at least 0.1 Sv/h.

8. The detection system according to claim 1 wherein the moderator sizes are selected such that a cumulative weight of the assembly is less than 5 kg.

9. The detection system according to claim 1 wherein said thermal neutron detector is positioned inside the hydrogenous spectroscopic fast neutron detector, which in turn is positioned inside the hydrogenous moderator, to achieve isotropic dose response to within ±25%.

10. The detection system according to claim 1 wherein the dosimetric accuracy of each assembly is improved through the addition of a layer of neutron-absorbing material within the moderator to reduce the number of excess thermal neutrons produced within the hydrogenous moderator that reach the thermal neutron detector relative to the number of intermediate-energy neutrons.

11. The detection system according to claim 10 wherein the layer of neutron-absorbing material includes Cd foil.

12. The detection system according to claim 1 wherein the hydrogenous spectroscopic fast neutron detector and thermal neutron detectors are scintillators having different pulse shapes to allow electronic separation of fast-neutron, thermal-neutron and gamma ray events.

13. The detection system according to claim 12 wherein the thermal sensitivity is derived from a coating of thermal-neutron-sensitive material applied to the surface of the fast-neutron scintillator.

14. The detection system according to claim 13 wherein the coating of thermal-neutron-sensitive material includes Li-6 loaded ZnS paint.

15. The detection system according to claim 13 wherein the coating of thermal-neutron-sensitive material includes B-10-loaded ZnS paint.

16. The detection system of claim 15 wherein the photodetector is a photomultiplier.

17. The detection system according to claim 13 wherein the coating of thermal-neutron-sensitive material includes scintillating paint.

18. The detection system according to claim 12 wherein the thermal neutron sensitivity is provided by a thermal-neutron-sensitive scintillator which includes Li-6 iodide.

19. The detection system according to claim 12 wherein the thermal neutron sensitivity is provided by a thermal-neutron-sensitive scintillator which includes Li-6 glass.

20. The detection system according to claim 12 wherein the thermal neutron sensitivity is provided by a thermal-neutron-sensitive scintillator which includes CLYC.

21. The detection system according to claim 12 wherein the thermal neutron sensitivity is provided by a thermal-neutron-sensitive scintillator which includes elpasolite compounds.

22. The detection system according to claim 12 wherein the hydrogenous spectroscopic fast neutron detector is doped with a thermal-neutron-sensitive material to provide both fast and thermal neutron signals separable by pulse-shape-discriminating techniques.

23. The detection system according to claim 12 wherein signals from both the fast and thermal neutron scintillators are viewed by a single photodetector and neutron/gamma pulse-shape-discrimination techniques are used to distinguish the signals from the two scintillators embedded within a single hydrogenous moderator.

* * * * *